United States Patent
Nord et al.

(10) Patent No.: US 6,662,662 B1
(45) Date of Patent: Dec. 16, 2003

(54) PRESSURE TRANSMITTER WITH IMPROVED ISOLATOR SYSTEM

(75) Inventors: Christina A. Nord, Burnsville, MN (US); David A. Horky, Mound, MN (US); Kenneth G. Guttsen, Chaska, MN (US); Thomas E. Johnson, St. Louis Park, MN (US); Matthew G. Sherin, Columbia Heights, MN (US); Kevin P. Szafranski, Foley, MN (US); William J. Ballot, New Brighton, MN (US); Renae M. Patrick, Eden Prairie, MN (US); Donald E. Harasyn, Eden Prairie, MN (US); Ryan R. Eidenschink, Plymouth, MN (US); Todd W. Schansberg, Jordan, MN (US); Mark G. Romo, Eden Prairie, MN (US); Steven M. Behm, White Bear Lake, MN (US); Bennett L. Louwagie, Plymouth, MN (US); Robert C. Hedtke, Young America, MN (US); Stanley E. Rud, Jr., Victoria, MN (US); Jeffrey C. Brekken, Richfield, MN (US)

(73) Assignee: Rosemount, Inc., Eden Prairie, MN (US)

( * ) Notice: Subject to any disclaimer, the term of this patent is extended or adjusted under 35 U.S.C. 154(b) by 0 days.

(21) Appl. No.: 09/564,506

(22) Filed: May 4, 2000

(51) Int. Cl.[7] ................................................ G01L 7/08
(52) U.S. Cl. ...................................................... 73/715
(58) Field of Search ............................. 73/70, 398, 40, 73/80, 718, 724, 753, 861; 375/295; 361/283, 283.1–283.4; 338/2, 42; 600/538

(56) References Cited

U.S. PATENT DOCUMENTS

| | | | |
|---|---|---|---|
| 3,701,280 A | 10/1972 | Stroman | 73/194 |
| 3,968,694 A | 7/1976 | Clark | 73/398 |
| 4,120,206 A | * 10/1978 | Rud, Jr. | 73/718 |
| 4,125,027 A | 11/1978 | Clark | 73/724 |
| 4,238,825 A | 12/1980 | Geery | 364/510 |

(List continued on next page.)

FOREIGN PATENT DOCUMENTS

| | | |
|---|---|---|
| DE | 0 268 742 | 6/1988 |
| DE | 37 41 648 A1 | 7/1988 |
| DE | G 91 09 176 | 10/1991 |
| DE | 197 45 244 A1 | 10/1997 |
| DE | 299 03 260 U1 | 5/2000 |

(List continued on next page.)

OTHER PUBLICATIONS

U.S. patent application Ser. No. 09/862,762, Wang, filed May 21, 2001.

U.S. patent application Ser. No. 09/867,961, Fandrey et al., filed May 30, 2001.

U.S. patent application Ser. No. 09/671,495, Behm et al., filed Sep. 27, 2000.

(List continued on next page.)

*Primary Examiner*—Andrew H. Hershfeld
*Assistant Examiner*—Marissa Ferguson
(74) *Attorney, Agent, or Firm*—Westman, Champlin & Kelly, P.A.

(57) ABSTRACT

A pressure transmitter with a fluid isolator that includes a sensor tube and a fill tube that have "D" shaped ends that connect together in a port internal to the transmitter. The shaped ends can be brazed into the port for sealing. Fitting both the sensor tube and the fill tube in the same port provides a low cost isolator with reduced isolator liquid volume. The fluid isolator has an isolator diaphragm with a central diaphragm region overlying a central backing plate that includes a annular groove. The annular groove avoids slow response of the isolator after an overpressure condition.

12 Claims, 6 Drawing Sheets

U.S. PATENT DOCUMENTS

| | | | |
|---|---|---|---|
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 CD |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 72/290 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/204 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.41 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,524,333 A | 6/1996 | Hogue et al. | 29/593 |
| 5,524,492 A * | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,670,722 A | 9/1997 | Moser et al. | 73/756 |
| 5,710,552 A | 1/1998 | McCoy et al. | 340/870.21 |
| 5,754,596 A | 5/1998 | Bischoff et al. | 375/295 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,988,203 A | 11/1999 | Hutton | 137/597 |
| 6,005,500 A | 12/1999 | Gaboury et al. | 341/43 |
| 6,006,338 A | 12/1999 | Longsdorf et al. | 713/340 |
| 6,038,927 A | 3/2000 | Karas | 73/706 |
| 6,050,145 A * | 4/2000 | Olson et al. | 73/706 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,140,952 A | 10/2000 | Gaboury | 341/143 |
| 6,216,172 B1 | 4/2001 | Kolblin et al. | 709/253 |
| 6,233,532 B1 | 5/2001 | Boudreau et al. | 702/89 |
| 6,285,964 B1 | 9/2001 | Babel et al. | 702/121 |

FOREIGN PATENT DOCUMENTS

| | | |
|---|---|---|
| EP | 0 063 685 A1 | 11/1982 |
| EP | 0 617 941 A | 1/1986 |
| EP | 0 214 801 A1 | 3/1987 |
| EP | 0 223 300 A2 | 5/1987 |
| EP | 0 639 039 A1 | 2/1995 |
| EP | 0 903 651 A1 | 3/1999 |
| JP | 40131038 | * 12/1989 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/519,781, Neslon et al., filed Mar. 7, 2000.

U.S. patent application Ser. No. 09/520,292, Davis et al., filed Mar. 7, 2000.

U.S. patent application Ser. No. 09/519,912, Nelson et al., filed Mar. 7, 2000.

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15, 2000.

U.S. patent application Ser. No. 09/564,506, Nord et al., filed May 4, 2000.

U.S. patent application Ser. No. 09/667,289, Westfield et al., filed Sep. 22, 2000.
U.S. patent application Ser. No. 09/667,399, Behm et al., filed Sep. 21, 2000.
U.S. patent application Ser. No. 09/671,130, Fandrey et al., filed Sep. 27, 2000.
U.S. patent application Ser. No. 29/120,531, Fandrey et al., filed Mar. 21, 2000.
U.S. patent application Ser. No. 29/120,544, Fandrey et al., filed Mar. 21, 2000.
U.S. patent application Ser. No. 29/120,538, Fandrey et al., filed Mar. 21, 2000.
U.S. patent application Ser. No. 29/120,552, Fandrey et al., filed Mar. 21, 2000.
U.S. patent application Ser. No. 29/120,537, Fandrey et al., filed Mar. 21, 2000.
U.S. patent application Ser. No. 29/120,553, Fandrey et al., filed Mar. 21, 2000.
Product Data Sheet No: 00813–0100–4378, "Model 751 Field Signal Indicator", by Rosemount Inc., Eden Prairie, Minnesota, (1997).
Product Data Sheet No: 00813–0100–4731, "APEX™ Radar Gauge", by Rosemount Inc., Eden Prairie, Minnesota, (1998).
Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.
Product Data Sheet No: 00813–0100–4003, "Model 8800A", by Rosemount Inc., Eden Prairie, Minnesota, (1998).
Product Data Sheet No: 00813–0100–4773, "Model 8742C–Magnetic Flowmeter Transmitter with FOUNDATION™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No: 00813–0100–4263, "Model 444 Alphaline® Temperature Tranmitters", by Rosemount Inc., Eden Prairie, Minnesota, (1997).
Product Data Sheet No: 00813–0100–4769, "Model 3244MV Multivariable Temperature Transmitter with FOUNDATION™ Fieldbus", by Rosemount Inc., Eden Prairie, Minnesota, (1998).
Product Data Sheet No: 00813–0100–4724, "Models 3144 and 3244MV Smart Temperature Transmitters", by Rosemount Inc., Eden Prairie, Minnesota, (1998).
Product Data Sheet No: 00813–0100–4738, "Model 3095FB Multivariable™ Transmitter with Modbus™Protocol", by Rosemount Inc., Eden Prairie, Minnesota, (1996, 1997).
Product Data Sheet No: 00813–0100–4001, "Model 3051 Digital Pressure Transmitter for Pressure, Flow, and Level Measurement", by Rosemount Inc., Eden Prairie, Minnesota, (1998).
Product Data Sheet No: 00813–0100–4698, "Model 2090F Sanitary Pressure Transmitter", by Rosemount Inc., Eden Prairie, Minnesota, (1998).
Product Data Sheet No: 00813–0100–4690, "Model 2088 Economical Smart Pressure Transmitter", by Rosemount Inc., Eden Prairie, Minnesota, (1998).
Product Data Sheet No: 00813–0100–4592, "Model 2024 Differential Pressure Transmitter", by Rosemount Inc., Eden Prairie, Minnesota, (1987–1995).

Product Data Sheet No: 00813–0100–4360, "Model 1151 Alphaline® Pressure Transmitters", by Rosemount Inc., Eden Prairie, Minnesota, (1998)
Product Data Sheet No: 00813–0100–4458, "Model 1135F Pressure–to–Current Converter", by Rosemount Inc., Eden Prairie, Minnesota, (1983, 1986, 1994).
"Single Chip Senses Pressure and Temperature," *Machine Design*, 64 (1992) May 21, No. 10.
Brochure: "Reduce Unaccounted–For Natural Gas with Hight–Accuracy Pressure Transmitters," Rosemount Inc. Measurement Division, Eden Prairie, Minnesota, ADS 3073, May 1991, pp. 1–4.
Technical Information Bulletin, "Liquid Level Transmitter Model DB40RL Sanitary Sensor *deltapilot*, " Endress +Hauser, Greenwood, Indiana, Sep. 1992, pp. 1–8.
"The Digitisation of Field Instruments" W. Van Der Bijl, *Journal A*, vol. 32, No. 3, 1991, pp. 62–65.
Specification Summary, "TELETRANS™ 3508–30A Smart Differential Pressure Transmitter," (undated) Bristol Babcock, Inc., Watertown, Ct, 06795.
Specification Summary, "TELETRANS™ 3508–10A Smart Pressure Transmitter," (undated) Bristol Babcock, Inc., Watertown, Ct, 06795.
Specification Summary, "AccuRate Advanced Gas Flow Computer, Model GFC 3308,"(undated) Bristol Babcock, Inc. Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush–Mount Hydrostatic Pressure Transmitter," Jul. 1992, Rosemount Inc., Eden Prairie, MN 55344.
"Flow Measurement,"*Handbook of Fluid Dynamics*, V. Streeter, Deitor–in–chief, published by McGraw–Hill Book Company, Inc. 1961, pp. 14–4 to 14–15.
"Precise Computerized In–Line Compressible Flow Metering," *Flow–Its Measurement and Control in Science and Industry*, vol 1, Part 2, Edited by R. Wendt, Jr., Published by American Institute of Physics et al, (undated) pp. 539–540.
"A Systems Approach," Dr. C. Ikoku, *Natural Gas Engineering*, PennWell Books, (undated) pp. 256–257.
"Methods for Volume Measurement Using Tank–Gauging Devices Can Be Error Prone," F. Berto, *The Advantages of Hydrostatic Tank Gauging Systems*, undated reprint from *Oil & Gas Journal*,
"Hydrostatic Tank Gauging –Technology Whose Time Has Come," J. Berto, *Rosemount Measurement Devision Product Feature*, undated reprint form *INTECH*.
"Pressure Sensors Gauge Tank Level and Fluid Density," *Rosemount Measurement Devision Product Feature*, undated reprint from *Prepared Foods* (Copyrighted 1991 by Gorman Publishing Company).
"Low Cost Electronic Flow Measurement System," *Tech Profile*, May 1993, Gas Research Institute, Chicago, IL.
"Development of an Integrated EFM Device for orifice Meter Custody Transfer Applications," S.D. Nieberle et al., *American Gas Association Distribution/Transmission Conference & Exhibit*, May 19, 1993.
Advertisement, AccuRate Model 3308 Integral Smart DP/P/T Transmitter, (undated) Bristol Babcock, Inc. Watertown, CT 06795.

Advertisement, Model 3508 DP Transmitter, *Control Engineering,* Dec. 1992, Bristol Babcock, Inc., Watertown, CT 06795.

"Smart Transmitters Tear UP The Market," C. Polsonetti, *INTECH,* Jul. 1993, pp. 42–45.

"MicroLAN Design Guide", Dallas Semiconductor, Tech Brief No. 1, (undated).

"Bosch CAN Specification Version 2.0", by Robert Bosch GmbH, pp. 1–68, including pp. –1–and–2–, (Sep. 1991).

Product Data Sheet No. 00813–0100–4001, "Digital Pressure Transmitter for Pressure, Flow, and Level Measurement", by Rosemount Inc., (1998).

"Claudius Ptolmey (100?–170?AD)", *M&C News,* 7 pages, (Apr. 1994).

American National Standard, "Hydraulic Fluid Power–Solenoid Piloted Industrial Valves–Interfaces Dimensions for Electrical Connectors", National Fluid Power Association, Inc., 10 pages, (Aug. 1981).

2 pages downloaded from http://www.interlinkbt.com/PRODUCT/IBT_PROD/DN/CN–DM_PN/EURO–DP.HTM dated Sep. 15, 2000.

4 pages downloaded form http://www.interlinkbt.com/PRODUCT/IBT_PROD/dn/EUR–CON/euro–fwc.htm dated Sep. 15, 2000.

3 pages from TURCK Cable Standards, by Turck, Inc., Minneapolis, Minnesota, (no date).

* cited by examiner

PRESSURE TRANSMITTER WITH IMPROVED ISOLATOR SYSTEM

BACKGROUND OF THE INVENTION

This invention relates to pressure transmitters for use in industrial process plants. In particular, this invention relates to isolators used in pressure transmitters.

Isolators use a relatively inert isolator liquid that couples pressure from a corrosive process fluid to a delicate pressure sensor. A flexible isolator diaphragm separates the corrosive process fluid from the isolator liquid, typically silicone oil. Isolator tubes or isolator passageways that are filled with the oil are used to couple pressure from the isolator diaphragm to the pressure sensor. Isolators prevent process fluids from contacting and interfering with the operation of the delicate pressure sensor.

Isolator tubes and passages are kept narrow to reduce the quantity of oil used in each isolator and thus reduce temperature errors due to oil expansion.

The narrow passageways, however, restrict the flow of oil and slow down the response of the pressure sensor. In particular, when excessive pressure (overpressure) is applied to a small isolator diaphragm at cold temperatures, the isolator diaphragm deflects and blocks ("valves off") the open end of an isolator passage directly under the isolator diaphragm. The isolator diaphragm acts much like a closed "valve" over the tiny open end of the narrow passage. When the passage is blocked, the pressure sensor is slow to respond to the overpressure.

An isolator arrangement is desired that has a low isolator liquid volume but which does not unduly inhibit rapid response of the pressure sensor.

SUMMARY OF THE INVENTION

Disclosed is a pressure transmitter with an improved isolator system.

According to one aspect of the invention, a pressure transmitter has an isolator system that includes passages in a sensor tube and a fill tube that are filled with an isolation liquid. The sensor tube and fill tube have shaped ends that are arranged to connect together in a common port in a transmitter body. The arrangement provides a reduced cost connection arrangement having low isolator liquid volume without unduly inhibiting the speed of the isolator.

According to another aspect of the invention, the isolator system has an isolator diaphragm with a central diaphragm region overlying a central backing plate. The central backing plate has an annular groove that is filled with isolator liquid and that intersects with a passageway filled with isolator liquid. During overpressure condition, the annular groove allows free flow of isolator liquid under the diaphragm so that "valve off" is avoided and the speed of the isolator is not inhibited.

The pressure transmitter provides a desired combination of small isolator diaphragm size, reduced temperature sensitivity and high speed in the operation of the isolator, particularly in cold temperatures during overpressure conditions.

DETAILED DESCRIPTION OF THE ILLUSTRATED EMBODIMENTS

Figure 1A:
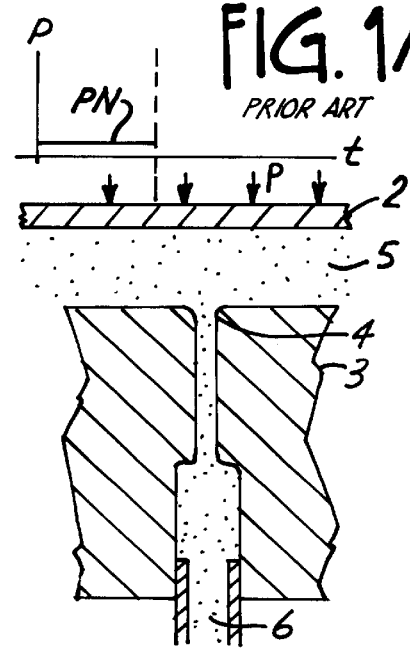
FIG. 1 schematically illustrates a time sequence in which "valve off" occurs in a PRIOR ART isolator.
Figure 1B:
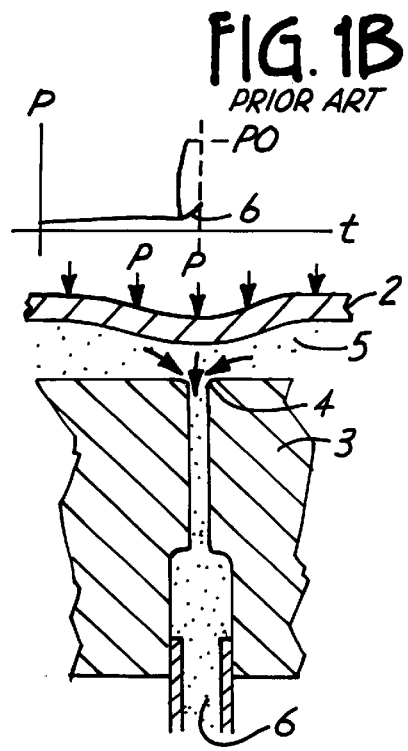
Figure 1C:
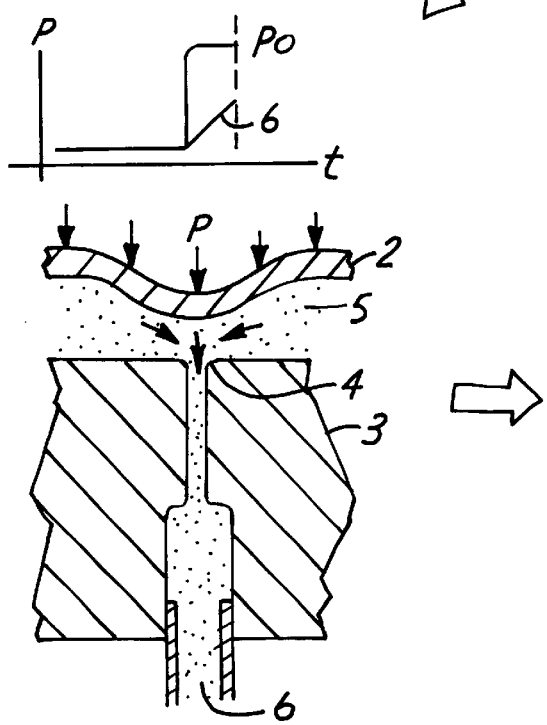
Figure 1D:
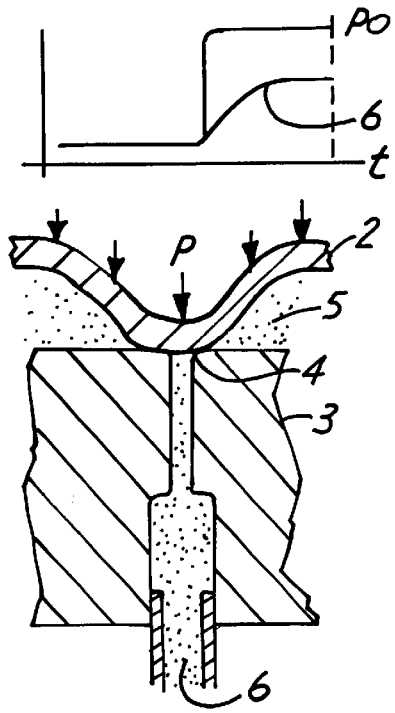

In pressure transmitters with fluid isolators, there is a need to keep isolator passageways small and narrow to reduce the volume of temperature sensitive silicone oil used as isolator liquid. There is also a conflicting requirement to keep passageways for the oil wide enough to allow rapid flow to keep transmitter response time fast, even when overpressure conditions compress the isolator diaphragm near its backing plate. In some cases, particularly at low temperatures when the oil is more viscous, a problem called "valve off" can occur.

FIG. 1 illustrates a time sequence of four stages in a PRIOR ART isolator in which "valve off" occurs. Each stage is illustrated by a plot of pressures "P" as a function of time "t" in which a dashed vertical line indicates current time. During the four stages illustrated, the process pressure increases from a normal pressure PN to an overpressure PO. Each stage is also illustrated by an cross-sectional drawing of the position of an isolator diaphragm 2 relative to a backing plate 3 having a round opening 4 of a passageway that leads to a pressure sensor (not shown). The isolator is filled with a silicone oil 5 illustrated by dots.

At stage 1A, process pressure is at a normal pressure PN. Slow variations in process pressure are conveyed normally to the pressure sensor.

At stage 1B, process pressure has increased to an overpressure PO which is outside the normal range of pressures. The silicone oil 5 flows through opening 4, but the pressure 6 at the pressure sensor lags behind the process pressure because the oil is viscous and there is a pressure drop in the narrow passageway. Isolator diaphragm 2 is depressed slightly as silicone oil 5 flows away under the area of the diaphragm 2 over the opening 4.

At stage 1C, process pressure is still at overpressure PO, and more silicone oil 5 has flowed through opening 4, further depressing the diaphragm 2.

At stage 1D, process pressure is still at overpressure PO, and enough silicone oil 5 has now flowed so that diaphragm 2 settles over opening 4, closing the opening 4 like a valve. The pressure 6 at the pressure sensor settles at a value that is less than PO, giving an erroneous indication of pressure. Stage 1D illustrates the "valve off" problem.

In the present invention, an isolator system for a pressure transmitter provides an adequate level of isolator liquid flow under the diaphragm, while maintaining a low volume of isolator liquid in the isolator system. Rather than a small opening at the end of a passageway, there is a continuous annular oil groove (or grooves) in a backing plate behind the isolator diaphragm. The continuous oil groove has enough area so that flow is widely distributed and the isolator diaphragm is not locally depressed over one small hole. Flow of oil is not "valved off" and an accurate and rapid indication of overpressure is obtained. After the overpressure is removed, the groove provides a supply of freely flowing oil behind the isolator diaphragm to ensure quick transmitter response after an overpressure condition as well.

The continuous annular groove tends to increase the amount of oil in the isolator by a small amount. The amount of oil in the isolator is decreased by a small amount, however, by using an arrangement which allows a sensor tube and a fill tube to be fitted into the same round hole. The tubes are shaped into a "double D" form to fit in a round hole or port and are brazed, soldered or welded in place. A separate passageway is not needed for each tube and less isolator liquid can be used.

Figure 2:
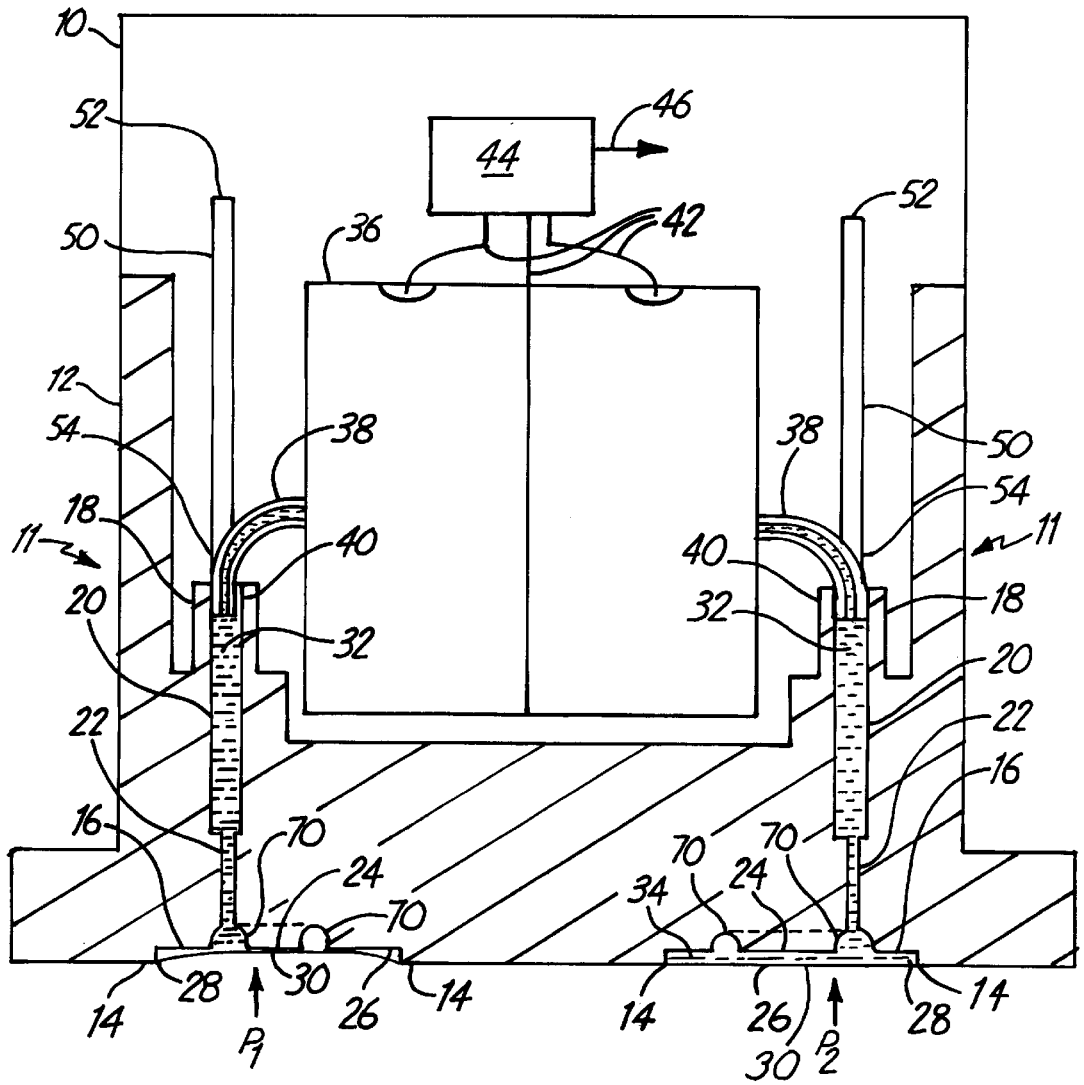
FIG. 2 schematically illustrates a differential pressure transmitter with isolators.

In FIG. 2, a differential pressure transmitter 10 is schematically illustrated. The transmitter 10 includes two similar or identical isolator systems indicated generally at 11 that provide fluid isolation from process pressures P1, P2. As illustrated in FIG. 2, pressure P1 is at overpressure and pressure P2 is in a normal operating range. Transmitter 10 includes a transmitter body 12 having external isolator rims 14 around shaped concavities 16 that each liquidly couple to ports 18 internal to the transmitter via passageway 20 through the body.

Each of the two passageways 20 preferably includes a narrowed region 22 produced by electrical discharge machining (EDM) that is narrow enough to provide flame quenching under fault conditions. Each concavity 16 has a central backing plate region 24. A deflectable isolator diaphragm 26 is provided with a diaphragm rim 28 sealed to the isolator rim 14, preferably by welding. The isolator diaphragm 26 has a central diaphragm region 30 overlying and spaced apart from the central backing plate region 24. The isolator diaphragm 26 can be formed in a conventional manner by hydrostatically swaging against a pattern of regularly spaced shallow concentric circular ridges (not illustrated) in shaped concavities 16.

Isolator liquid 32 fills the passageways in the isolator systems 11 including spaces 34 between the isolator diaphragm 26 and the shaped concavity 16. Isolator liquid 32 also fills the passageways 20, 22 and internal passageways in a differential pressure sensor 36. Differential pressure sensor 36 receives pressures from the ports 18 via sensor tubes 38, which are filled with isolator liquid 32, as well. Sensor tubes 38 have first shaped ends 40 disposed in the ports 18. The sensor 36 generates a pressure output on lines 42. Lines 42 couple to a transmitter circuit 44 and transmitter circuit 44 generates a transmitter output on line 46 that represents the differential pressure.

Fill tubes 50 are internal to the transmitter 10 and are adapted to seal off the isolation liquid 32 in the isolator systems 11. The fill tubes 50 have shaped ends 54 disposed in the ports 18.

Figure 3B:
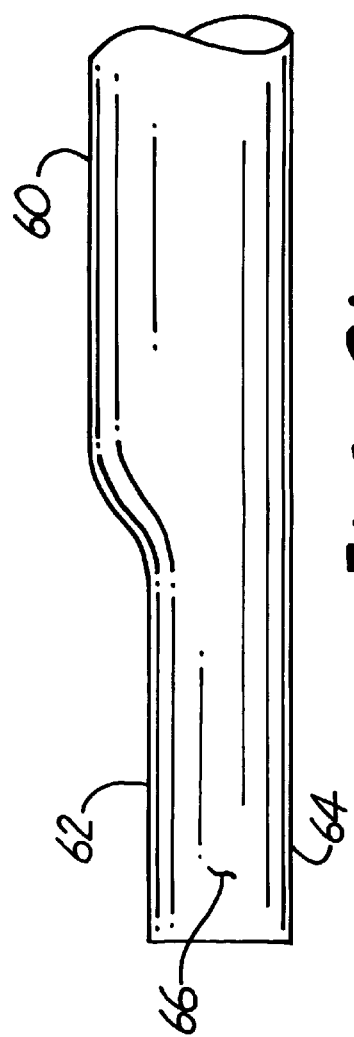
FIG. 3 illustrates a "D" shaped end of a tube.
Figure 3A:
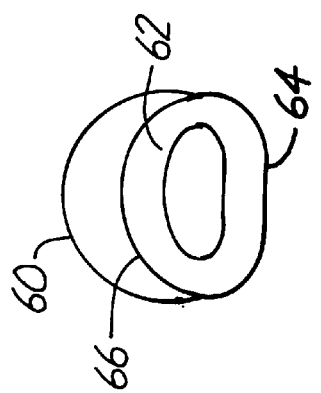

FIG. 3 illustrates details that are applicable to shaped ends 40 for sensor tubes 38 and shaped ends 54 for fill tubes 50. In FIG. 3, a generally cylindrical tube 60 has a shaped end 62 that has been distorted, shaped or swaged to a shape that is generally a "D" shape, with a generally flat side 64 and a generally semicircular side 66.

Figure 4:
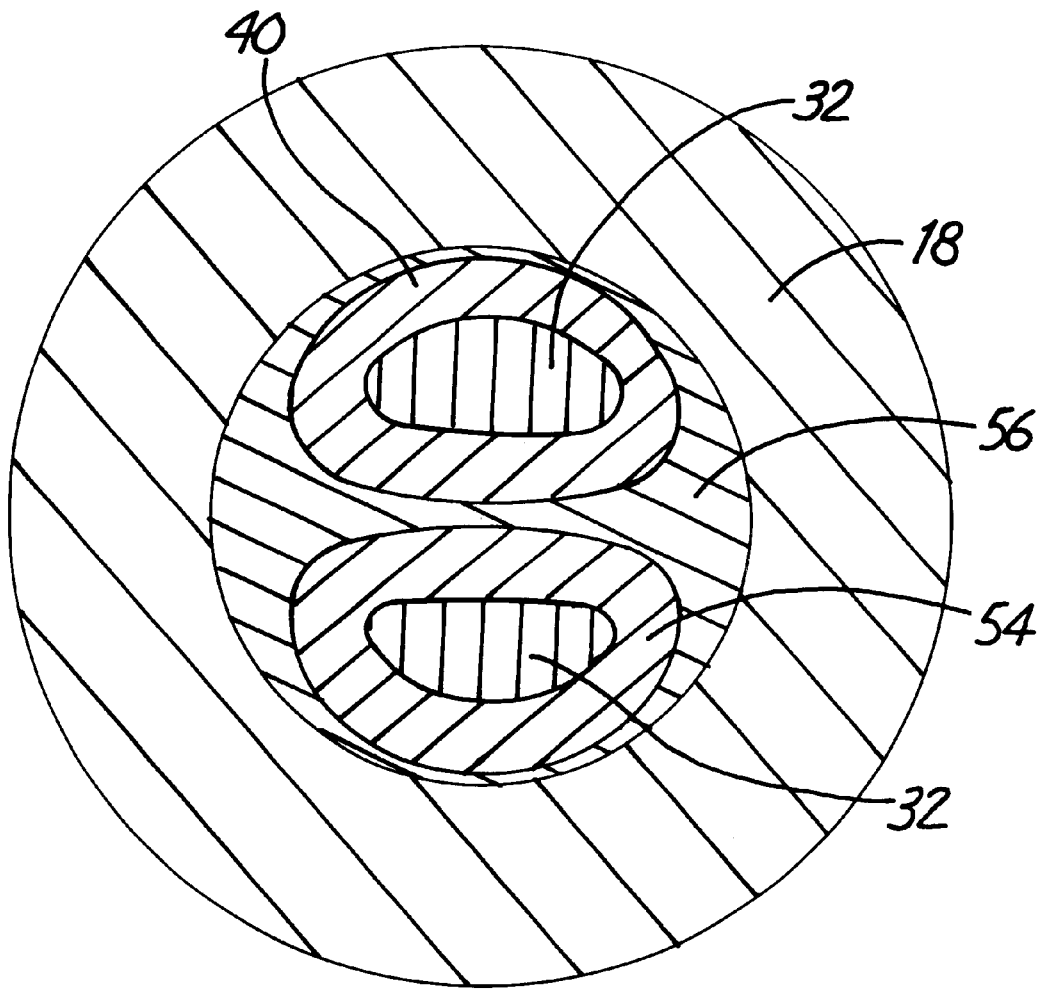
FIG. 4 illustrates two "D" shaped tube ends connected together in a common round port of a transmitter body.

FIG. 4 illustrates how a shaped end 40 of a sensor tube 38 and a shaped end 54 of fill tube 50 are brought together in a common round port 18. Shaped ends 40, 54 have "D" shapes that, when placed together on the respective flat sides, form a generally circular cross section that fits in the common round port 18. Round port 18 includes a boss that is raised beyond the transmitter body to provide lower thermal mass for rapid brazing. A brazing preform or brazing paste 56 fills the gaps between the shaped ends 40, 54 and the round port 18. The port 18 is heated, preferably by a laser, to melt the braze material 56 and form a sealed braze joint. Various known braze, solder or welding processes can be used to complete this joint. After the joint has cooled, it is later filled with isolator fluid 32 as explained in more detail below. The use of one separate passage from the fill tube to the concavity and another separate passage from the sensor tube to the concavity is avoided. A single passageway in the transmitter body connects to both the fill tube and the sensor tube to the concavity, and the quantity of isolator fluid used is reduced and temperature performance is improved.

It will be understood by those skilled in the art that other shapes can be used to fit two tubes in a common port. For example, rectangular tube ends can be fit together in a common rectangular port. It will also be understood by those skilled in the art that various types of know isolator liquids can be used.

Referring to FIGS. 2, 3, 4, fill tubes 50 initially have open ends 52 that are temporarily connected to a charging manifold (not shown) during the manufacturing process. The charging manifold is connected to a vacuum pump and is used to evacuate the various passageways in the isolator systems 11 so there are no traces of air or moisture left in the passageways. Next, the charging manifold is used to supply a quantity or charge of isolator liquid 32 that fills the passageways in the isolator systems 11. The isolator liquid 32 is typically a de-gassed silicone oil that has low compressibility to transfer pressure. The isolator liquid 32 also typically also has a high dielectric constant to serve as a dielectric for sensing capacitances in the pressure sensor 36. After the isolator systems 11 are filled with isolator liquid 32, external pressures P1 and P2 can be adjusted. This pressurization deflects the isolator diaphragms 26 to desired positions so that a controlled amount of isolator liquid 32 is in each isolator system 11 when the fill tubes are pinched shut and then brazed or welded shut at ends 52.

Referring to FIG. 2, the central backing plate regions 24 include continuous annular groove 70 that intersects with the passageway 22. The annular groove 70 is made large enough so that the isolator diaphragm 26 will not "valve off" on the circular groove during overpressure conditions. In one embodiment, the groove 70 has side walls that are perpendicular to the plane of the isolator diaphragm 26, making it difficult for the isolator diaphragm 26 to be pushed down to the base of the groove 70. The end of passageway 22 is left open for easy flow of isolator liquid after overpressure conditions. The flow of isolator liquid is not "valved off" by the diaphragm covering a small aperture at the open end of a narrow passageway 22. The groove 70 is too large in area for the isolator diaphragm to depress enough to seal off the groove 70. The groove 70 remains open to receive flow of isolator liquid during overpressure conditions. The passageway 22 intersects with the groove 70 at the base of the groove to allow flow of isolator liquid under all pressure conditions.

Figure 5:
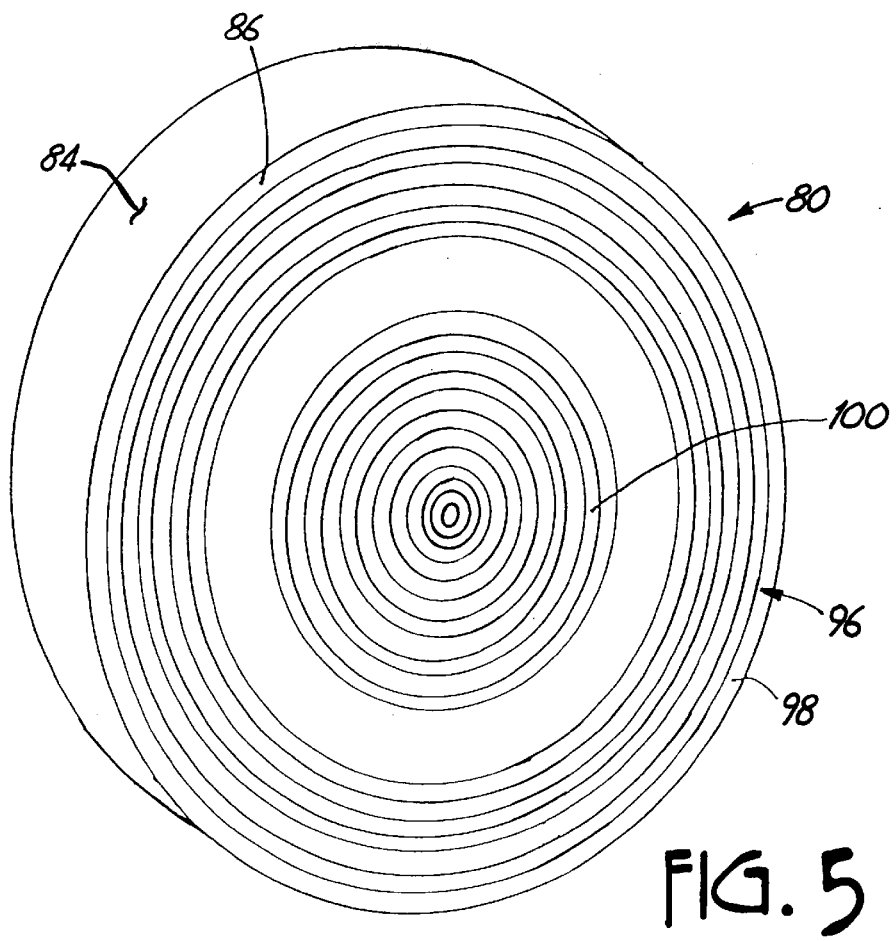
FIGS. 5–6 schematically illustrate a pressure transmitter with a single isolator.
Figure 6:
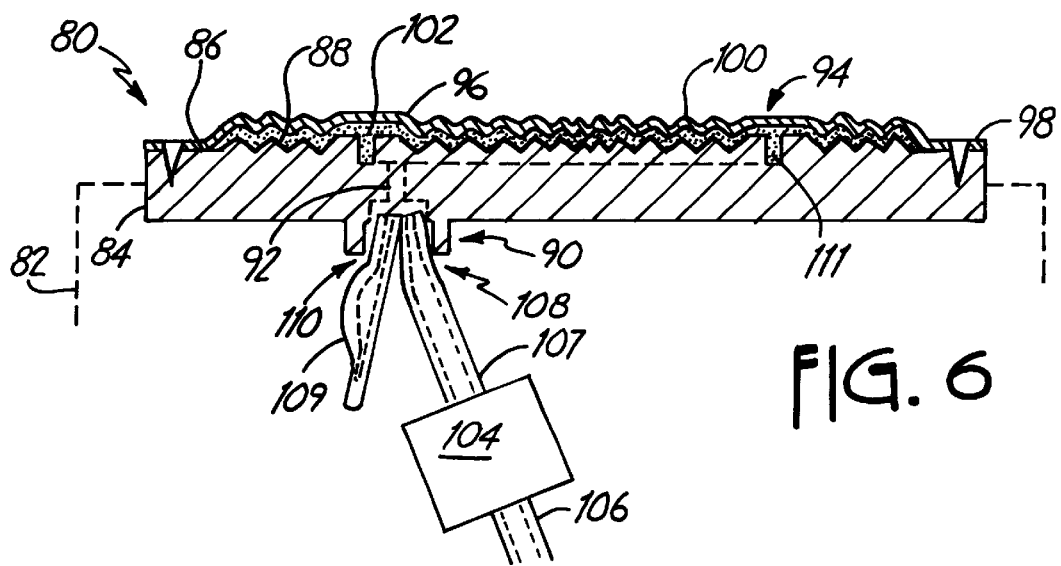

In FIGS. 5–6, an alternative embodiment of an isolator 80 for use in a pressure transmitter 82 is illustrated. Isolator 80 includes a round transmitter body 84 that has an external isolator rim 86 around a shaped concavity 88 that is liquidly coupled to a round port 90 internal to the transmitter 82 via a passageway 92 through the body 84. The concavity 88 has a central backing plate region 94.

An isolator diaphragm 96 has a diaphragm rim 98 sealed to the isolator rim 86 by welding. Isolator diaphragm 96 includes a central diaphgrm region 100 overlying and spaced apart from the central backing plate region 94.

There is an isolator liquid 102 that is between the isolator diaphragm 96 and the shaped concavity 88 and that is also in the passageway 92.

A pressure sensor 104 receives pressure from the port 90 via a sensor tube 107 with a first shaped end 108 disposed in the round port 90. The sensor 104, which can be a gauge or absolute pressure sensor, generates a pressure output 106 which is coupled to a transmitter circuit as explained above in connection with FIG. 1.

A fill tube 109 internal to the transmitter 82 seals off the isolator 80 so that isolator fluid is contained, as explained in connection with FIGS. 2–4 above. The fill tube 109 has a shaped end 110 disposed in the round port 90.

The central backing plate region 94 includes a continuous annular groove 111 that intersects with the passageway 92, also as explained above in connection with FIGS. 2–4.

FIG. 7 illustrates arrangements of isolator backing plates.

Figure 7C:
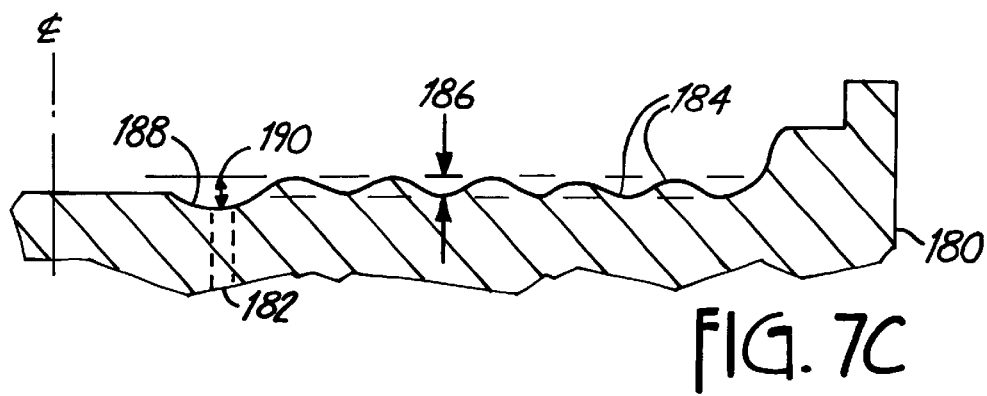
FIG. 7 illustrates isolator diaphragm backing plates.
Figure 7B:
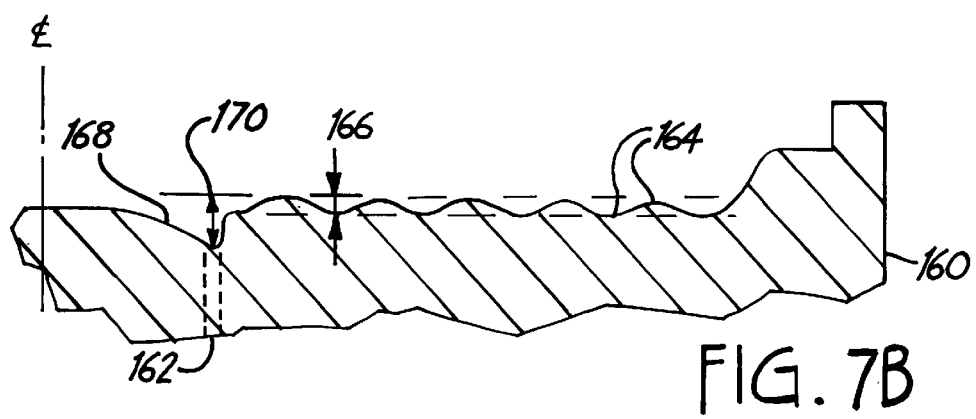
Figure 7A:
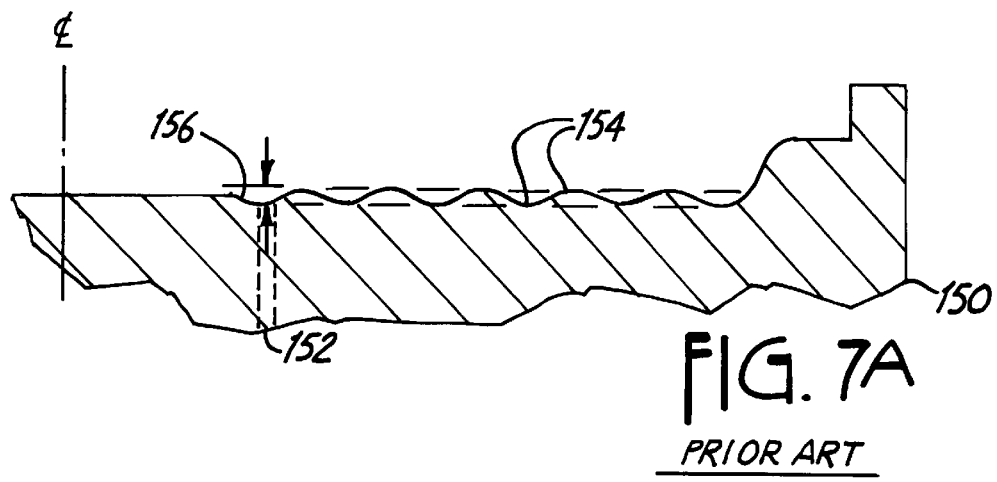

In FIG. 7A, a PRIOR ART backing plate 150 is shown with an oil passageway 152 intersecting the backing plate. The backing plate 150 has concentric undulations 154, and the oil passageway 152 emerges in a shallow portion 156 of one of these undulations 154. When the charge or amount of oil is kept low enough to provide a small amount of expansion due to temperature, then the arrangement shown in FIG. 7A can be subject to "valve off" under certain operating conditions, particularly at low temperatures under overpressure conditions.

In FIG. 7B, a backing plate 160 is shown with an passageway 162 for isolator fluid. The backing plate 160 has concentric undulations 164 with a depth 166 of about 0.1 millimeter (0.004 inches) peak-to-peak. A concentric annular groove 168 is cut into the backing plate and has a depth 170 of at least twice the depth 166 of the undulations 164. The deep groove 168 provides a large surface area for flow of isolator liquid and avoids "valve off" with a small charge of isolator liquid, even under adverse operating conditions such as low temperatures and overpressure. The groove 168 has a cross-sectional shape that is a notch.

In FIG. 7C, a backing plate 180 is shown with an passageway 182 for isolator fluid. The backing plate 180 has concentric undulations 184 with a depth 186 of about 0.1 millimeter (0.004 inches) peak-to-peak. A deeper concentric undulation 188 is cut into the backing plate 180 and has a depth 190 of at least twice the depth 186 of the undulations 184. The deep undulation 188 provides a large surface area for flow of isolator fluid and avoids "valve off" with a small charge of isolator fluid, even under adverse operating conditions such as low temperatures and overpressure. The groove 188 has a cross-sectional shape that is an undulation in the surface of the backing plate of sufficient depth to prevent valve off.

It will be apparent to those skilled in the art that various shapes can be used for the concentric annular groove, and that multiple continuous annular grooves can also be used.

The arrangements disclosed herein provide a cost effective way of filling pressure transmitter isolators with isolator liquid such as silicone oil. It avoids the use of additional fill ports or pins. The fill tube and sensor tube are easily swaged to dimensions that do not need to be carefully controlled because braze material flows when heated to fill any irregularities between the shaped tube ends and the round ports. The assembly is adaptable to common tube materials such as Hastalloy alloy C-276, Carpenter Glass Sealing alloy 52 or various stainless steel alloys. Heat for the brazing can be provided in a controlled manner using commercially available YAG lasers.

Although the present invention has been described with reference to preferred embodiments, workers skilled in the art will recognize that changes may be made in form and detail without departing from the spirit and scope of the invention.

What is claimed is:

1. A pressure transmitter with an improved isolator system, comprising:
    a transmitter body having an external isolator rim around a shaped concavity that is liquidly coupled to a port internal to the transmitter through a passageway through the body, the concavity having a central backing plate region;
    an isolator diaphragm having a diaphragm rim sealed to the isolator rim and having a central diaphragm region overlying and spaced apart from the central backing plate region;
    isolator liquid between the isolator diaphragm and the shaped concavity and in the passageway;
    a pressure sensor receiving pressure from the port through a sensor tube with a first shaped end disposed in the port, the sensor generating a pressure output;
    a fill tube internal to the transmitter and adapted to seal off the isolator, the fill tube having a second shaped end disposed in the port; and
    the central backing plate region including an annular groove that intersects with passageway.

2. The pressure transmitter of claim 1 wherein the first and second shaped ends are brazed in the port.

3. The pressure transmitter of claim 2 wherein the first and second shaped ends have shapes that are approximately a "D" shape.

4. The pressure transmitter of claim 3 wherein transmitter body includes a raised boss surrounding the port.

5. The pressure transmitter of claim 4 wherein the pressure transmitter is a differential pressure transmitter.

6. A pressure transmitter with an improved isolator system, comprising:
    a transmitter body having an external isolator rim around a shaped concavity that is liquidly coupled to a port internal to the transmitter through a passageway through the body, the concavity having a central backing plate region;
    an isolator diaphragm having a diaphragm rim sealed to the isolator rim and having a central diaphragm region overlying and spaced apart from the central backing plate region;
    isolator liquid between the isolator diaphragm and the shaped concavity and in the passageway;
    a pressure sensor receiving pressure from the port through a sensor tube with a first shaped end disposed in the port, the sensor generating a pressure output;
    a fill tube internal to the transmitter and adapted to seal off the isolator, the fill tube having a second shaped end disposed in the port; and
    the fill tube and the sensor tube being shaped to fit together in the port and brazed in the port.

7. The pressure transmitter of claim 6 wherein the central backing plate region includes a annular groove that intersects with the passageway and is filled with isolator liquid.

8. The pressure transmitter of claim 7 wherein the annular groove is shaped as an undulation having a depth sufficient to avoid valve-off.

9. The pressure transmitter of claim 8 wherein the groove remains filled with isolator liquid under overpressure conditions.

10. The pressure transmitter of claim 9 wherein the passageway intersects with the groove at the bottom of the groove.

11. A pressure transmitter with an improved isolator system, comprising:

a transmitter body having an external isolator rim around a shaped concavity that is liquidly coupled to a port internal to the transmitter through a passageway through the body, the concavity having a central backing plate region;

an isolator diaphragm having a diaphragm rim sealed to the isolator rim and having a central diaphragm region overlying and spaced apart from the central backing plate region;

isolator liquid between the isolator diaphragm and the shaped concavity and in the passageway;

a pressure sensor receiving pressure from the port through a sensor tube with a first shaped end disposed in the port, the sensor generating a pressure output; and a fill tube internal to the transmitter and adapted to seal off the isolator, the fill tube having a second shaped end disposed in the port.

12. A pressure transmitter with an improved isolator system, comprising:

a transmitter body having an external isolator rim around a shaped concavity that is liquidly coupled to a port internal to the transmitter through a passageway through the body, the concavity having a central backing plate region;

an isolator diaphragm having a diaphragm rim sealed to the isolator rim and having a central diaphragm region overlying and spaced apart from the central backing plate region;

isolator liquid between the isolator diaphragm and the shaped concavity and in the passageway;

a pressure sensor receiving pressure from the port through a sensor tube with a first shaped end disposed in the port, the sensor generating a pressure output;

a fill tube internal to the transmitter and adapted to seal off the isolator, the fill tube having a second shaped end disposed in the port; and means for providing, in the central backing plate region, an annular groove that intersects with the passageway.

* * * * *

UNITED STATES PATENT AND TRADEMARK OFFICE
CERTIFICATE OF CORRECTION

PATENT NO. : 6,662,662 B1 Page 1 of 1
DATED : December 16, 2003
INVENTOR(S) : Nord et al.

It is certified that error appears in the above-identified patent and that said Letters Patent is hereby corrected as shown below:

<u>Title page,</u>
Item [56], References Cited, FOREIGN PATENT DOCUMENTS, "EP 0 617 941 A" should be -- EP 0 167 741 A --

Signed and Sealed this

Twenty-fifth Day of May, 2004

JON W. DUDAS
*Acting Director of the United States Patent and Trademark Office*